US012330905B2

(12) United States Patent
Takai

(10) Patent No.: US 12,330,905 B2
(45) Date of Patent: Jun. 17, 2025

(54) ELEVATOR CHARGING SYSTEM, ELEVATOR MANAGEMENT SERVER, MOVING BODY, MOVING BODY SERVER, ELEVATOR CHARGING METHOD, AND STORAGE MEDIUM

(71) Applicant: Mitsubishi Electric Corporation, Tokyo (JP)

(72) Inventor: Manato Takai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 201 days.

(21) Appl. No.: 17/918,332

(22) PCT Filed: Apr. 17, 2020

(86) PCT No.: PCT/JP2020/016878
§ 371 (c)(1),
(2) Date: Oct. 12, 2022

(87) PCT Pub. No.: WO2021/210166
PCT Pub. Date: Oct. 21, 2021

(65) Prior Publication Data
US 2023/0143635 A1    May 11, 2023

(51) Int. Cl.
*B66B 1/06* (2006.01)
*B66B 1/34* (2006.01)
(Continued)

(52) U.S. Cl.
CPC .............. *B66B 1/06* (2013.01); *B66B 1/3461* (2013.01); *B66B 1/468* (2013.01); *G05D 1/0027* (2013.01);
(Continued)

(58) Field of Classification Search
CPC ......... B66B 1/06; B66B 1/3461; B66B 1/468; B66B 2201/20; B66B 2201/4653;
(Continued)

(56) References Cited

U.S. PATENT DOCUMENTS 12,043,517 B2 * 7/2024 Li ........................... B66B 1/468
2011/0295816 A1   12/2011 Sasano et al.
(Continued)

FOREIGN PATENT DOCUMENTS

CN    110921444 A    3/2020
JP    11-147675 A    6/1999
(Continued)

OTHER PUBLICATIONS

CN 110921444 A with English Translation Attached; Inventor: Wang; Published: Dec. 2019 (Year: 2019).*
(Continued)

*Primary Examiner* — Joseph C Rodriguez
(74) *Attorney, Agent, or Firm* — XSENSUS LLP

(57) ABSTRACT

Provided are an elevator charging system, a management server, a moving body, a moving body server, a charging method, and a storage medium storing program that make it possible to charge usage fees reflecting the demand of moving bodies. In a charging system (1), cars (5) transport moving bodies (11) between a plurality of floors. A communication unit (7a) receives usage requests each corresponding to one of the moving bodies (11). Each of the requests includes information about a call requesting assignment to one of the cars (5), and information about a desired price for a usage fee. An assignment unit (8) assigns each call to one of the cars (5) while prioritizing calls in requests having higher priority, based on information including the (Continued)

desired prices. A storage unit (9a) stores therein the fees charged for the requests of which the calls have been assigned.

18 Claims, 10 Drawing Sheets

(51) Int. Cl.
*B66B 1/46* (2006.01)
*G05D 1/00* (2006.01)
*G06Q 20/14* (2012.01)
*G06Q 20/38* (2012.01)

(52) U.S. Cl.
CPC ......... *G06Q 20/145* (2013.01); *G06Q 20/389* (2013.01); *B66B 2201/215* (2013.01); *B66B 2201/404* (2013.01); *B66B 2201/4638* (2013.01); *B66B 2201/4653* (2013.01); *B66B 2201/4661* (2013.01); *B66B 2201/4676* (2013.01); *B66B 2201/4692* (2013.01)

(58) Field of Classification Search
CPC .......... B66B 2201/4692; G05D 1/0027; G06Q 20/145; G06Q 20/389
See application file for complete search history.

(56) References Cited

U.S. PATENT DOCUMENTS

| | | | |
|---|---|---|---|
| 2019/0276273 A1* | 9/2019 | Zhang | B66B 1/468 |
| 2021/0155451 A1* | 5/2021 | Liu | B66B 1/468 |
| 2021/0284485 A1* | 9/2021 | Nichols | B66B 1/468 |
| 2022/0027448 A1* | 1/2022 | Takai | G06F 21/31 |
| 2023/0110004 A1* | 4/2023 | Bloomgren | B66B 1/468 |
| | | | 187/388 |

FOREIGN PATENT DOCUMENTS

| | | |
|---|---|---|
| JP | 2004-196485 A | 7/2004 |
| JP | 2011-254475 A | 12/2011 |
| JP | 2019-57050 A | 4/2019 |
| WO | 2003/014990 A1 | 2/2003 |

OTHER PUBLICATIONS

International Search Report mailed on Sep. 24, 2020, received for PCT Application PCT/JP2020/016878, filed on Apr. 17, 2020, 5 pages including English Translation.

* cited by examiner

ELEVATOR CHARGING SYSTEM, ELEVATOR MANAGEMENT SERVER, MOVING BODY, MOVING BODY SERVER, ELEVATOR CHARGING METHOD, AND STORAGE MEDIUM

Cross-Reference to Related Application

The present application is based on PCT filing PCT/JP2020/016878, filed Apr. 17,2020, the entire contents of which is incorporated herein by reference.

The present disclosure is related to an elevator charging system, an elevator management server, a moving body, a moving body server, an elevator charging method, an elevator charging program, an elevator usage program, an elevator usage request data structure, and an elevator usage history data structure.

BACKGROUND

PTL 1 discloses an example of an elevator system. In the elevator system, an autonomous running robot boards a car of an elevator and moves between a plurality of floors.

However, in the system disclosed in PTL 1, when a plurality of moving bodies such as autonomous running robots move by using the car, the transport capacity of the elevator may be occupied by the plurality of moving bodies. To cope with this situation, by charging usage fees for the usage of the elevator by the moving bodies, it is possible to adjust the transport capacity so that the usage of the elevator by human passengers is not easily hindered. However, the usage fees charged in this situation may fail to reflect the demand of the moving bodies for using the elevator.

The present disclosure is related to solving the problem described above. The present disclosure provides an elevator charging system, a management server, a moving body, a moving body server, a charging method, a charging program, a usage program, and a usage request data structure that make it possible to charge usage fees reflecting the demand of the moving bodies for the usage.

Solution to Problem

An elevator charging system according to the present disclosure includes: one or more cars each capable of transporting any one of a plurality of moving bodies, by running between a plurality of floors; a communication unit that receives one or more usage requests each of which includes information about a call requesting to be assigned to one of the one or more cars and information about a desired price for a usage fee of the car and each of which corresponds to a different one of the plurality of moving bodies; an assignment unit that assigns each of the calls to one of the one or more cars, while prioritizing calls in usage requests having higher priority among the one or more usage requests received by the communication unit, based on information including the desired prices; and a storage unit that stores therein the usage fee to be charged for each of the usage requests of which the calls were assigned by the assignment unit.

An elevator management server according to the present disclosure includes: a communication unit that receives one or more usage requests each of which includes information about a call requesting to be assigned to one of one or more cars each capable of transporting any one of a plurality of moving bodies by running between a plurality of floors and information about a desired price for a usage fee of the car and each of which corresponds to a different one of the plurality of moving bodies; an assignment unit that assigns each of the calls to one of the one or more cars, while prioritizing calls in usage requests having higher priority among the one or more usage requests received by the communication unit, based on information including the desired prices; and a storage unit that stores therein the usage fee to be charged for each of the usage requests of which the calls were assigned by the assignment unit.

A moving body according to the present disclosure includes: a request generation unit that generates a usage request including information about a call requesting to be assigned to one of one or more cars each running between a plurality of floors and information about a desired price for a usage fee of the car; and a communication unit that transmits the usage request generated by the request generation unit to a management server that assigns each call to one of the one or more cars, while prioritizing calls in usage requests having higher priority among one or more usage requests received, based on information including desired prices.

A moving body server according to the present disclosure includes: a moving body control unit that remotely controls moving of a moving body; a request generation unit that generates a usage request which includes information about a call requesting to be assigned to one of one or more cars each running between a plurality of floors and information about a desired price for a usage fee of the car and which corresponds to the moving body; and a communication unit that transmits the usage request generated by the request generation unit to a management server that assigns each call to one of the one or more cars, while prioritizing calls in usage requests having higher priority among one or more usage requests received, based on information including desired prices.

An elevator charging method according to the present disclosure includes: a reception step of receiving one or more usage requests each of which includes information about a call requesting to be assigned to one of one or more cars each capable of transporting any one of a plurality of moving bodies by running between a plurality of floors and information about a desired price for a usage fee of the car and each of which corresponds to a different one of the plurality of moving bodies; an assignment step of assigning each of the calls to one of the one or more cars, while prioritizing calls in usage requests having higher priority among the one or more usage requests received in the reception step, based on information including the desired prices; and a charging step of storing the usage fee to be charged for each of the usage requests of which the calls were assigned in the assignment step.

An elevator charging program according to the present disclosure causes a management server for an elevator to perform the following steps, the elevator having one or more cars each capable of transporting any one of a plurality of moving bodies by running between a plurality of floors: a reception step of receiving one or more usage requests each of which includes information about a call requesting to be assigned to one of the one or more cars and information about a desired price for a usage fee of the car and each of which corresponds to a different one of the plurality of moving bodies; an assignment step of assigning each of the calls to one of the one or more cars, while prioritizing calls in usage requests having higher priority among the one or more usage requests received in the reception step, based on information including the desired prices; and a charging step of storing the usage fee to be charged for each of the usage requests of which the calls were assigned in the assignment step.

An elevator usage program according to the present disclosure causes a moving body to perform the following steps, the moving body being capable of moving between a plurality of floors, by using one of one or more cars of an elevator each running between the plurality of floors: a request generation step of generating a usage request which includes information about a call requesting to be assigned to one of the one or more cars and information about a desired price for a usage fee of the car and which corresponds to the moving body; and a transmission step of transmitting the usage request generated in the request generation step to a management server that assigns each call to one of the one or more cars, while prioritizing calls in usage requests having higher priority among one or more usage requests received, based on information including desired prices.

An elevator usage program according to the present disclosure causes a moving body server to perform the following steps, the moving body server remotely controlling moving of a moving body capable of moving between a plurality of floors by using one of one or more cars of an elevator each running between the plurality of floors: a request generation step of generating a usage request which includes information about a call requesting to be assigned to one of the one or more cars and information about a desired price for a usage fee of the car and which corresponds to the moving body; and a transmission step of transmitting the usage request generated in the request generation step to a management server that assigns each call to one of the one or more cars, while prioritizing calls in usage requests having higher priority among one or more usage requests received, based on information including desired prices.

An elevator usage request data structure according to the present disclosure includes: information about a call requesting to be assigned to one of one or more cars each capable of transporting any one of a plurality of moving bodies by running between a plurality of floors; and information about a desired price for a usage fee of the car; and the elevator usage request data structure is used for an assignment process by which each call is assigned to one of the one or more cars while prioritizing calls in usage requests having higher priority based on information including the desired price.

An elevator usage history data structure according to the present disclosure includes: information about a usage fee to be charged for a usage request of which a call has been assigned by an assignment process by which each call is assigned to one of one or more cars while prioritizing calls in usage requests having higher priority among one or more usage requests based on information including desired prices, the one or more usage requests each of which including information about a call requesting to be assigned to one of the one or more cars each capable of transporting any one of a plurality of moving bodies by running between a plurality of floors and information about a desired price for a usage fee of the car, while each of the one or more usage requests corresponds to a different one of the plurality of moving bodies; and the elevator usage history data structure is used for a collection process of collecting the usage fee.

Advantageous Effect of Invention

By using the elevator charging system, the management server, the moving body, the moving body server, the charging method, the charging program, the usage program, or the usage request or usage history data structure set forth in the present disclosure, it is possible to charge the usage fees reflecting the demand of the moving bodies for the usage.

DESCRIPTION OF EMBODIMENTS

Figure 1:
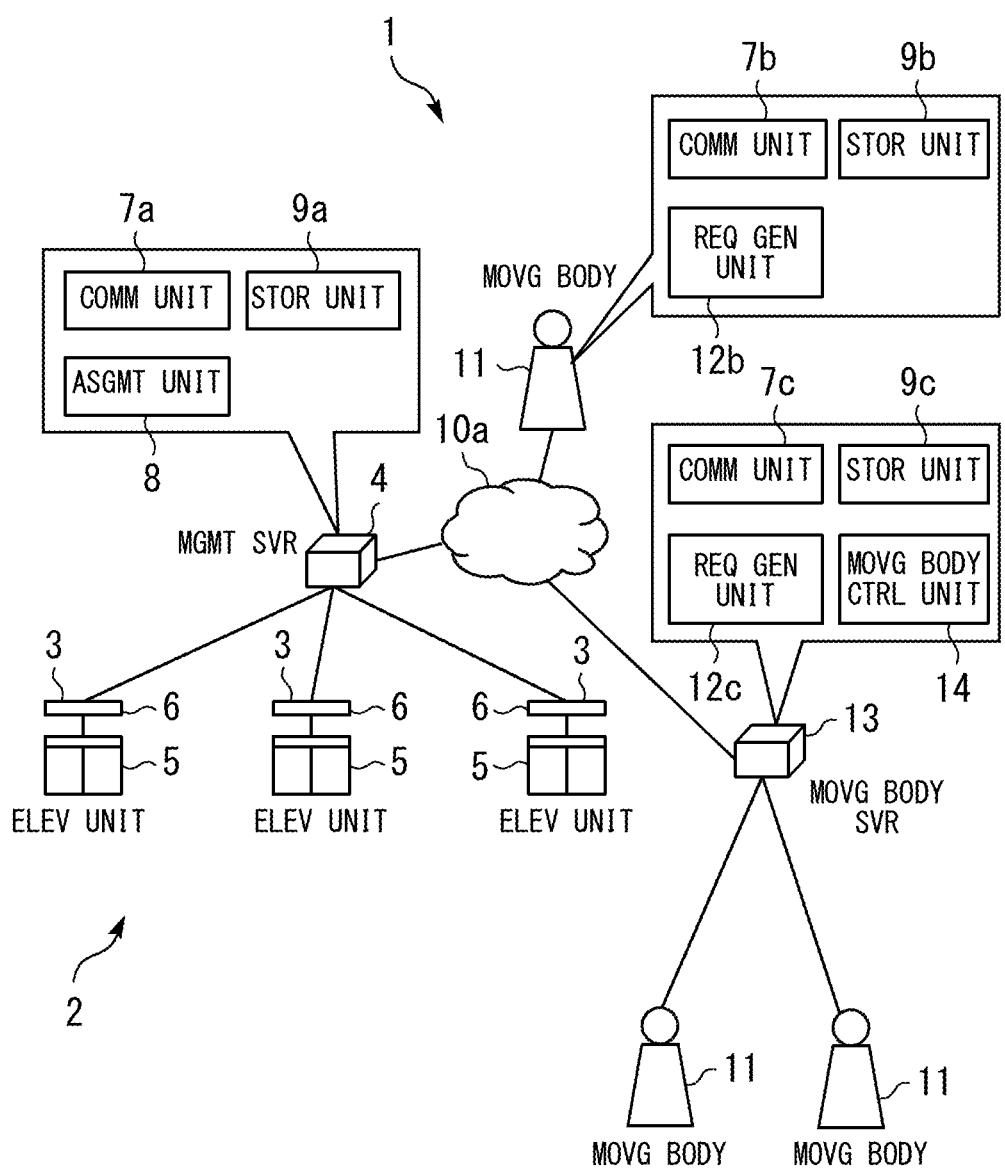
FIG. 1 A configuration diagram of a charging system according to Embodiment 1.

Embodiments for carrying out the present disclosure will be explained, with reference to the accompanying drawings. In the drawings, some of the elements that are the same as or equivalent to each other will be referred to by using the same reference characters, and duplicate explanations thereof will be simplified or omitted, as appropriate.

Embodiment 1

FIG. 1 is a configuration diagram of a charging system 1 according to Embodiment 1.

The charging system 1 is a system that charges a usage fee for usage of an elevator 2. The elevator 2 is applied to a building having a plurality of floors.

In the building to which the elevator 2 is applied, a shaft (not shown) is provided. The shaft is a space extending over the plurality of floors. On each of the floors, a hall (not shown) is provided. In the hall, a hall door (not shown) is provided. The hall door is a door that separates the hall and the shaft from each other.

The elevator 2 includes one or more elevator units 3 and a management server 4. In the present example, the elevator 2 includes a plurality of elevator units 3. Each of the elevator units 3 is connected to the management server 4.

Each of the elevator units 3 includes a car 5 and a control panel 6. The car 5 is a device that transports passengers and the like by running between the plurality of floors. The car 5 is provided with a car door. The car door is a device that, while the car 5 is stopped at any of the floors, opens and closes the hall door in conjunction with the car door, so that the passengers and the like are able to board and alight the car 5. The control panel 6 is an apparatus that controls operations of the car 5. The operations of the car 5 include, for example, running in the shaft and opening and closing the car door.

The management server 4 is an apparatus that manages services of the elevator 2. The services of the elevator 2 include, for example, assigning each call to the car 5 of any one of the elevator units 3 and charging the usage fee for the usage of the elevator 2. The management server 4 may be represented by, for example, a single unit or multiple units of server computers. In another example, the management server 4 may be a virtual server in a cloud service, for instance. In yet another example, the management server 4 may be a group control apparatus. The management server 4 includes a communication unit 7*a*, an assignment unit 8, and a storage unit 9*a*.

The communication unit 7*a* is a part that communicates with a device or an apparatus provided outside the management server 4. The communication unit 7*a* is connected to a network 10*a*. Examples of the network 10*a* include the Internet. The communication unit 7*a* is connected to each of the elevator units 3.

The assignment unit 8 is a part that assigns each call to the car 5 of any one of the elevator units 3.

The storage unit 9*a* is a part that stores information therein. A history of the management of the management server 4 is stored in the storage unit 9*a*.

In this situation, each of the cars 5 of the elevator 2 is provided with a function of transporting, besides human passengers, a moving body 11 between the plurality of floors. The moving body 11 is a device that provides a service by moving in the building in which the elevator 2 is installed. The moving body 11 may be, for example, a robot that moves by walking, running, or flying. Examples of the moving body 11 include: a security robot that provides security in a moving range; a delivery robot that carries an article such as a meal or a delivery package; and a medical emergency robot that carries a person who requires medical help. In the charging system 1, a plurality of moving bodies 11 move by using the elevator 2.

The management server 4 charges the usage fee for the usage of the elevator 2 by the moving bodies 11 which are the devices. Operations of the management server 4 regarding the usage of the elevator 2 by the moving bodies 11 are performed on the basis of an installed charging program, for example. The usage fee will be paid by a provider of the service using a moving body 11, for example. Alternatively, the usage fee may directly be paid by a user who receives the service using a moving body 11, for example. In the present example, the management server 4 does not charge a usage fee for the usage of the elevator 2 by human passengers.

For example, each of the moving bodies 11 is provided with a function to move autonomously. For example, each of the moving bodies 11 that moves autonomously includes a communication unit 7*b*, a storage unit 9*b*, and a request generation unit 12*b*.

The communication unit 7*b* is a part that communicates with a device or an apparatus provided outside the moving body 11. The communication unit 7*b* is connected to the network 10*a*.

The storage unit 9*b* is a part that stores information therein. The information about the moving body 11 is stored in the storage unit 9*b*. The information about the moving body 11 includes, for example, information such as a moving body identification (ID) for identifying the moving body 11 and attributes of the moving body 11, or the like. Examples of the attributes of the moving body 11 include information about a usage type of the moving body 11, the scale of the moving body 11, and the existence or absence of functions in the moving body 11. The usage type of the moving body 11 indicates, for example, a classification of the service provided by the moving body 11, such as "medical emergency", "security", or "delivery". Examples of the scale of the moving body 11 include the size or the weight of the moving body 11. Examples of the functions of the moving body 11 include a function of sharing a ride of a car 5 with human passengers.

The request generation unit 12*b* is a part that generates a usage request for usage of the elevator 2 by the moving body 11. The usage request generated by the request generation unit 12*b* of the moving body 11 is data corresponding to the moving body 11. Operations of the moving body 11 regarding the usage of the elevator 2 are performed on the basis of an installed usage program, for example.

Further, each of the moving bodies 11 may be provided with a function of moving under remote control. Each of the moving bodies 11 moving under the remote control moves on the basis of a control signal sent from an external apparatus such as a moving body server 13, for example. The moving body server 13 is an apparatus that controls moving of the one or more moving bodies 11. The moving body server 13 may be represented by, for example, a single unit or multiple units of server computers. The moving body server 13 may be a virtual server in a cloud service, for example. The moving body server 13 is connected to the network 10*a*. For example, the moving body server 13 remotely controls the moving of the moving bodies 11, by transmitting control signals via the network 10*a*. Alternatively, the moving body server 13 may transmit the control signals to the moving bodies 11 via a communication network other than the network 10*a*. The moving body server 13 includes a communication unit 7*c*, a moving body control unit 14, a storage unit 9*c*, and a request generation unit 12*c*.

The communication unit 7*c* is a part that communicates with a device or an apparatus provided outside the moving body server 13. The communication unit 7*c* is connected to the network 10*a*.

The moving body control unit 14 is a part that remotely controls the moving of the moving bodies 11. The moving body control unit 14 transmits the control signals to the moving bodies 11 via the network 10*a*, by employing the communication unit 7*c*, for example.

The storage unit 9*c* is a part that stores information therein. The information about each of the moving bodies 11 of which the moving is controlled by the moving body server 13 is stored in the storage unit 9*c*.

The request generation unit 12*c* is a part that generates a usage request for the usage of the elevator 2 by any of the moving bodies 11. The usage request generated by the request generation unit 12*c* of the moving body server 13 is data corresponding to any of the moving bodies 11 of which the moving is controlled by the moving body server 13. The usage request generated by the request generation unit 12*c* of the moving body server 13 is the data having a structure similar to that of the usage request generated by the request generation unit 12*b* in each of the moving bodies 11. In this situation, the usage request generated by the request generation unit 12*c* of the moving body server 13 may include information identifying the moving body server 13. Operations of the moving body server 13 regarding the usage of the elevator 2 by any of the controlled moving bodies 11 are performed on the basis of an installed usage program, for example.

The usage request includes information identifying a corresponding one of the moving bodies 11, information about a call, information about a desired price for the usage fee, and information about the attributes of the corresponding one of the moving body 11. The information about a call is information of a call from a moving body 11 requesting the assignment unit 8 to be assigned to the car 5 of one of the elevator units 3. The information about the call from a moving body 11 includes, for example, information about a departure floor and a destination floor of the moving body 11. The desired price for the usage fee may be set, for example, in accordance with the service provided by the moving body 11. For example, when the desired price for the usage fee is set to a value such as an initial value or an upper limit value, these values may be set in advance by the provider of the service using the moving body 11, for instance. Alternatively, these values may be set in advance by a user who receives the service using the moving body 11, for example. The information about the attributes of the moving body 11 included in the usage request may be a part of the information about the attributes of the moving body 11.

The usage request is generated, for example, when a corresponding one of the moving bodies 11 enters the hall of the elevator 2. Alternatively, the usage request may be generated before a corresponding one of the moving bodies 11 enters the hall of the elevator 2. In that situation, the usage request may include a predicted value for the time at which the moving body 11 may enter the hall. The usage request generated by the request generation unit 12b of any of the moving bodies 11 is transmitted by the communication unit 7b of the moving body 11 to the management server 4 via the network 10a, for example. The usage request generated by the request generation unit 12c of the moving body server 13 is transmitted by the communication unit 7c of the moving body server 13 to the management server 4 via the network 10a, for example.

Each of the moving bodies 11 is provided with a function of transmitting an electronic signature to the management server 4, when boarding a car 5 to which a call has been assigned according to a usage request. In this situation, the electronic signature is an electronic signature indicating identity of the moving body 11 boarding the car 5 with the moving body 11 corresponding to the usage request. In this situation, the usage request may include information about a public key corresponding to a secret key used for encrypting the electronic signature. In another example, the public key may be distributed by a certificate authority. The legitimacy of the electronic signature may be verified by the assignment unit 8, for example.

Next, examples of operations of the charging system 1 will be explained, with reference to FIG. 2 to FIG. 5.

Figure 2:
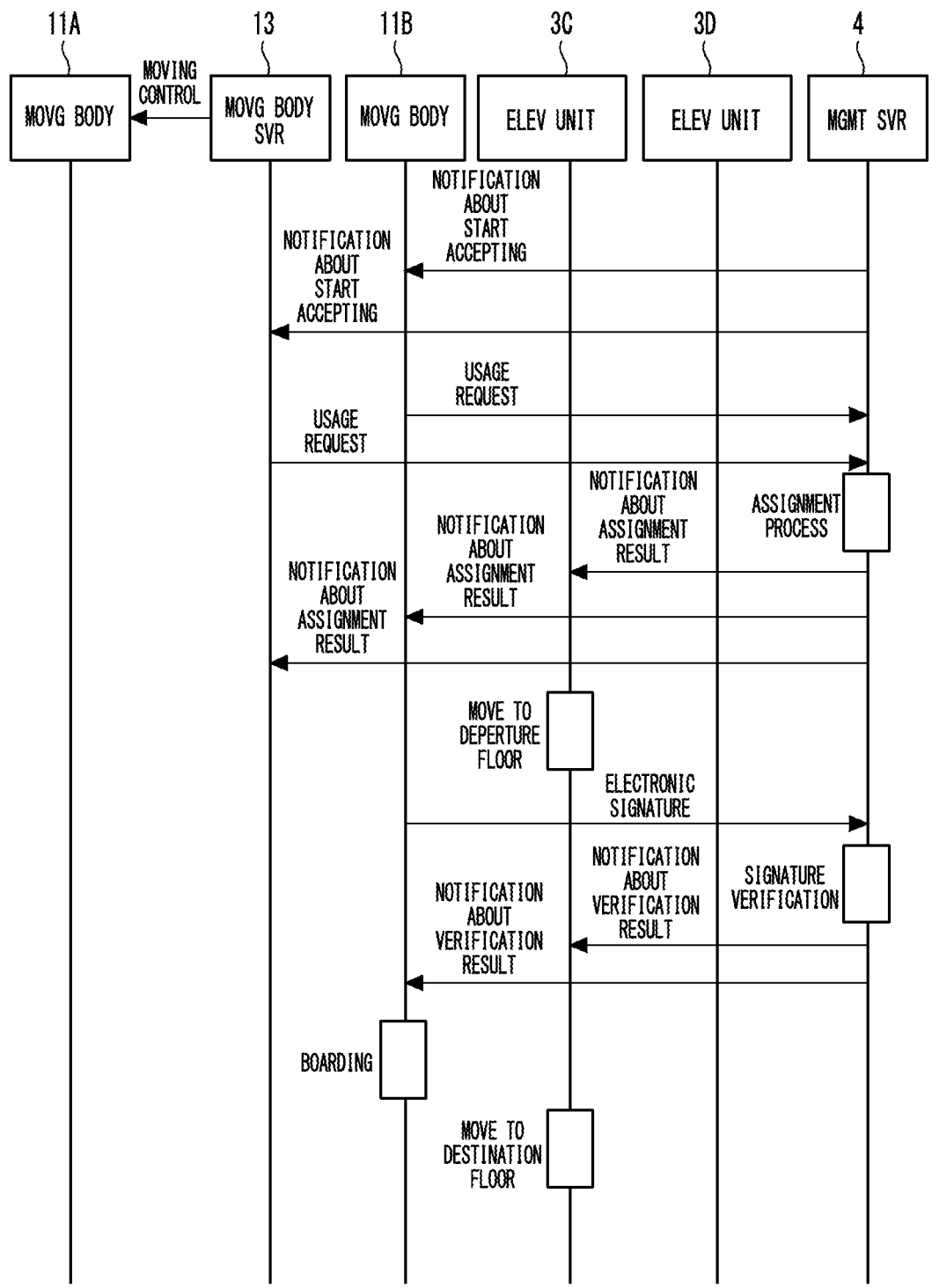
FIG. 2 A sequence diagram showing an example of the operations of the charging system according to Embodiment 1.

FIG. 2 is a sequence diagram showing an example of the operations of the charging system 1 according to Embodiment 1.

Figure 3:
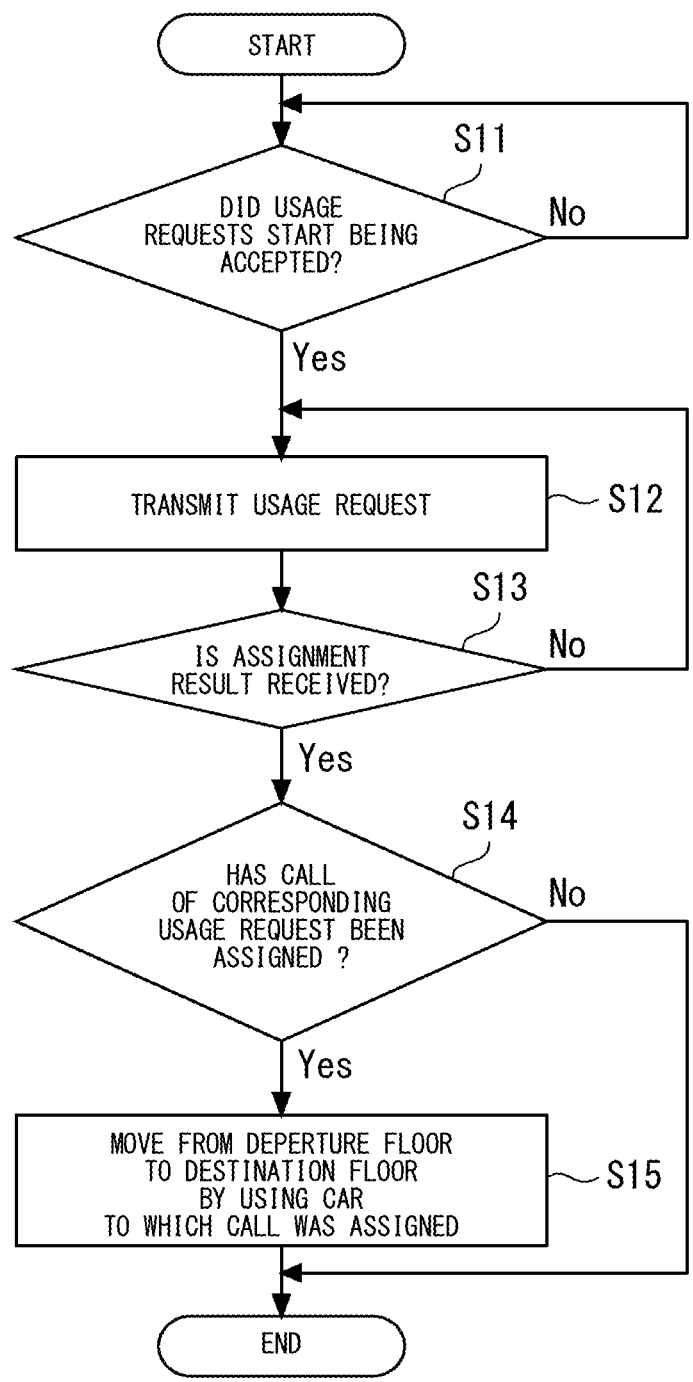
FIG. 3 A flowchart showing an example of operations of any of the moving bodies according to Embodiment 1.

FIG. 3 is a flowchart showing an example of operations of any of the moving bodies 11 according to Embodiment 1.

Figure 4:
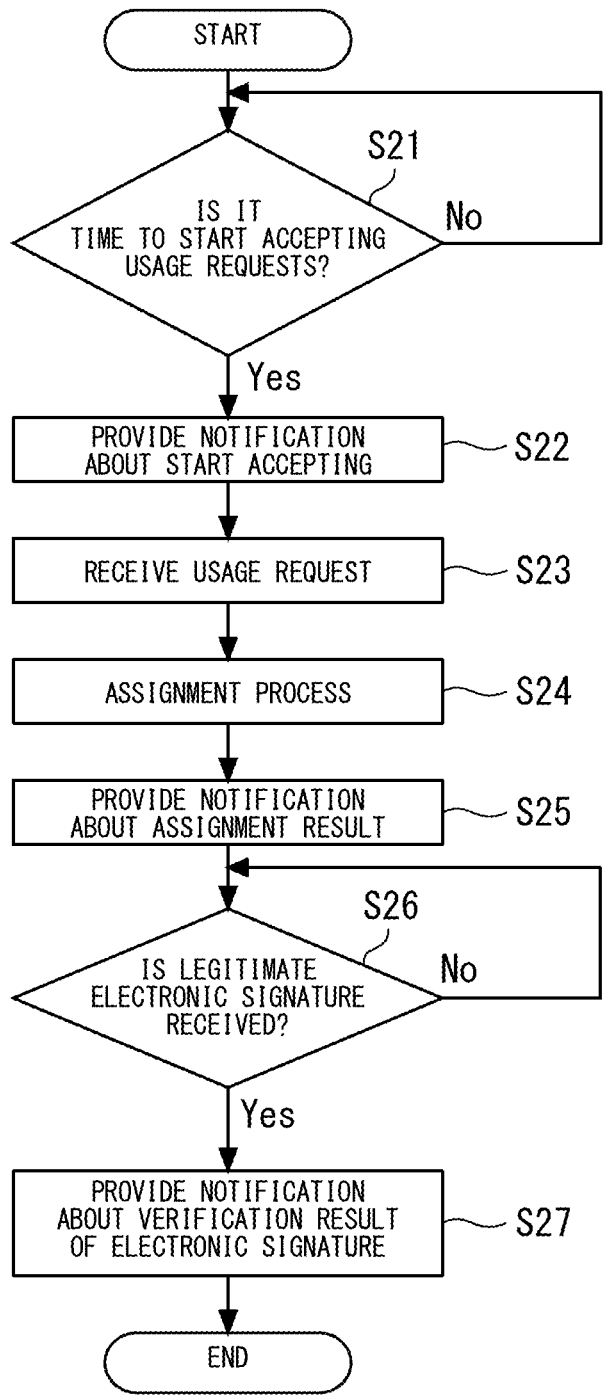
FIG. 4 A flowchart showing an example of operations of the management server according to Embodiment 1.

FIG. 4 is a flowchart showing an example of operations of the management server 4 according to Embodiment 1.

Figure 5:
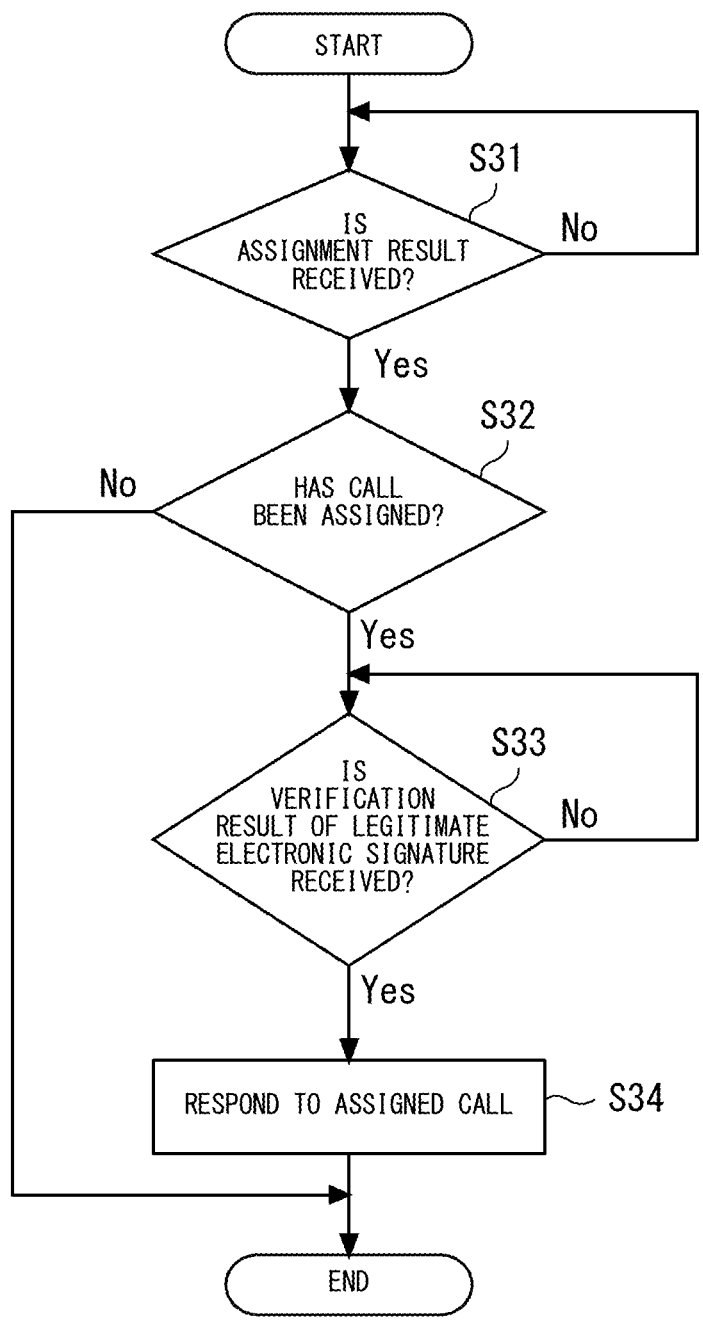
FIG. 5 A flowchart showing an example of operations of the elevator unit according to Embodiment 1.

FIG. 5 is a flowchart showing an example of operations of the elevator unit 3 according to Embodiment 1.

FIG. 2 shows the example of operations of the entirety of the charging system 1.

In the present example, usage of the elevator 2 by a moving body 11A and a moving body 11B is requested. The moving of the moving body 11A is controlled by the moving body server 13.

The assignment unit 8 of the management server 4 sets a transport resource of the elevator 2, on the basis of a status of the elevator 2 or the like. The transport resource is information indicating a transport capacity that can be applied to the transport of the moving bodies 11 from the transport capacity of the elevator 2. The transport resource may be, for example, a capacity corresponding to the number of cars 5 to which calls from the moving bodies 11 can be assigned, i.e., a capacity corresponding to the number of elevator units 3 of which the cars 5 are able to have the calls from the moving bodies 11 assigned thereto. For example, the assignment unit 8 may determine, with respect to the elevator 2, the transport capacities of the elevator units 3 of which the cars 5 have not been assigned with calls, as the transport resource. The assignment unit 8 may determine the transport capacities of all the elevator units 3 of the elevator 2 as the transport resource. The assignment unit 8 may limit the elevator units 3 to be calculated into the transport resource depending on the time of the day. During a lunch time of an office building or the like, for example, the assignment unit 8 may apply fewer elevator units 3 to the transport of the moving bodies 11 than in other parts of the day, so that a larger transport capacity is applied to the transport of human passengers. In the present example, the assignment unit 8 sets the transport capacities of an elevator unit 3C having a car 5C and another elevator unit 3D having a car 5D, as the transport resource.

The management server 4 starts accepting usage requests for each of the cycles that are set in advance, for example. When starting to accept the usage requests, the management server 4 notifies the moving bodies 11 and the moving body server 13 in the charging system 1 by broadcasting a notification, for example. Alternatively, the management server 4 may provide a notification that usage requests started being accepted in response to an inquiry from any of the moving bodies 11 or the moving body server 13. In another example, the management server 4 may start accepting usage requests, when a usage request is transmitted thereto from any of the moving bodies 11. Further, when there is no transport resource, the management server 4 does not need to start accepting usage requests. If the transport resource is exhausted after the usage requests start being accepted, the management server 4 may stop accepting the usage requests.

The request generation unit 12c of the moving body server 13 generates a usage request corresponding to the moving body 11A. When an initial value is set with the desired price for the usage fee, for example, the request generation unit 12c generates the usage request in which the initial value is the desired price. If usage requests have started being accepted, the communication unit 7c of the moving body server 13 transmits the usage request generated by the request generation unit 12c to the management server 4.

The request generation unit 12b of the moving body 11B generates a usage request corresponding to the moving body 11B. When an initial value is set with the desired price for the usage fee, for example, the request generation unit 12b generates the usage request in which the initial value is the desired price. If usage requests have started being accepted, the communication unit 7b of the moving body 11B transmits the usage request generated by the request generation unit 12b to the management server 4.

The communication unit 7a of the management server 4 receives the usage request corresponding to the moving body 11A and the usage request corresponding to the moving body 11B.

In this situation, with respect to the received usage requests, the management server 4 may disclose information about the desired prices for the usage fee to each of the moving bodies 11 and the moving body server 13. Each of the moving bodies 11 and the moving body server 13 may re-transmit a usage request generated with an updated desired price for the usage fee, in accordance with the information disclosed about the desired prices for the usage fee. For example, when the desired price disclosed regarding a usage request corresponding to another moving body 11 is higher than the desired price of its own, the request generation unit 12b of the moving body 11B may generate a usage request updated with a higher desired price. When an upper limit value is set with the desired price for the usage fee, the request generation unit 12b of the moving body 11B or the like generates a usage request having a desired price in a range not exceeding the upper limit value.

After that, the assignment unit 8 of the management server 4 performs an assignment process in the following manner, for example.

The assignment unit 8 calculates priority with respect to each of a plurality of usage requests that were received. For example, the priority may be calculated in accordance with the desired prices for the usage fee. The priority may be the values themselves of the desired prices for the usage fee. In another example, the priority may be calculated in accordance with both the desired prices for the usage fee and the attributes of the moving bodies 11 corresponding to the usage requests. The priority may be calculated by adding values corresponding to the attributes to the values of the desired prices for the usage fee, for instance. In yet another example, the priority may be calculated by applying other arithmetic operations, mathematical functions, or the like corresponding to the attributes of the moving bodies 11, to the desired prices for the usage fees. In yet another example, the assignment unit 8 may consider a usage request belonging to the usage type "medical emergency", which has a high degree of urgency, as a usage request having the highest priority regardless of the desired price for the usage fee.

Further, with respect to a usage request including a prediction value for the time (entry time) at which the moving body 11 may enter the hall, if the time difference between the present time and the entry time exceeds a threshold value set in advance, the assignment unit 8 may suspend the assignment process for that usage request until the time difference becomes smaller than the threshold value.

The assignment unit 8 assigns the call in the usage request having the highest priority, to the car 5 of one of the elevator units 3 calculated into the transport resource. In this situation, if the number of received usage requests is one, the assignment unit 8 assigns the call in the usage request to the car 5 of one of the elevator units 3 calculated into the transport resource.

The assignment unit 8 judges whether or not the moving body 11 is able to use the car 5 to which the call from the moving body 11 was assigned. For example, the assignment unit 8 judges whether or not the car 5 is usable on the basis of the scale of the moving body 11. Further, when the moving body 11 does not have the function of sharing a ride with human passengers, for example, the assignment unit 8 judges that it is impossible to use any cars 5 on which passengers have already boarded. When having judged that the moving body 11 is unable to use the car 5 to which the call from the moving body 11 was assigned, the assignment unit 8 re-assigns, to the car 5, another call in the usage request having the second highest priority after that of the moving body 11. In the present example, the assignment unit 8 assigns the call from the moving body 11B to the car 5C.

The assignment unit 8 stores a usage fee to be charged for the usage request of which the call was assigned, into the storage unit 9a of the management server 4. The stored usage fee is the desired price presented in the usage request, for example. In the charging system 1, usage fees are collected on the basis of the information stored in the storage unit 9a of the management server 4. The process of collecting the usage fees may be performed by the assignment unit 8, for example. Alternatively, the process of collecting the usage fees may be performed by a server apparatus (not shown) or the like in the charging system 1 that performs an account settlement process and the like.

The communication unit 7a of the management server 4 notifies the control panel 6 of the elevator unit 3C of an assignment result. The communication unit 7a of the management server 4 notifies the moving body server 13 for the moving body 11A from which the usage request was received and the moving body 11B of the assignment result.

After that, the control panel 6 of the elevator unit 3C notified of the assignment result causes the car 5C to run to the departure floor of the moving body 11B.

The moving body 11B of which the call in the corresponding usage request has been assigned moves to the hall on the departure floor so as to be able to board the car 5C. Alternatively, if already present in the hall, the moving body 11B waits in the hall for the car 5C to arrive. Meanwhile, at the next time when usage requests start being accepted, the request generation unit 12c of the moving body server 13 again generates a usage request corresponding to the moving body 11A of which the call has not been assigned.

After that, the car 5C arrives at the departure floor of the moving body 11B. In this situation, the car 5C maintains the car door closed even after stopping at the departure floor. In this situation, the elevator 2 may have the function of letting people in the hall on the departure floor know that the moving body 11B is to use the car 5C. The elevator 2 may let the people know, for example, by indicating information in the hall, by giving voice guidance in the hall, or projecting information onto the hall door that opens and closes in conjunction with the car door of the car 5C or onto the floor surface to the front of the hall door. The elevator 2 may let the people know through dynamic mapping of an image indicating, on the floor surface, a route from the current position of the moving body 11 to a position in front of the hall door, by using arrows or the like.

At the time of boarding the car 5C, the communication unit 7b of the moving body 11B transmits the electronic signature to the management server 4. In this situation, a secret key for encrypting the electronic signature corresponds to the public key included in the usage request generated by the moving body 11B, for example.

The communication unit 7a of the management server 4 receives the electronic signature transmitted from the moving body 11B. For example, the assignment unit 8 verifies the identity of the moving body 11 by checking to see whether or not it is possible to decrypt the electronic signature by using the public key included in the usage request of which the call has been assigned.

The communication unit 7a of the management server 4 notifies the control panel 6 of the elevator unit 3C of a verification result of the electronic signature. The communication unit 7a of the management server 4 notifies the moving body 11B which transmitted the electronic signature of the verification result of the electronic signature. In this situation, if the electronic signature is illegitimate, the communication unit 7a of the management server 4 does not need to provide the notification about the verification result of the electronic signature.

If the electronic signature is illegitimate, the car 5C maintains the car door closed. The car 5C waits to open the car door, until being notified by the management server 4 of a verification result indicating a legitimate electronic signature. In this situation, the car 5C waits on the departure floor. Because the car 5C maintains the car door closed, any moving body 11 that transmitted an illegitimate electronic signature is not to board the car 5C.

On the contrary, when the electronic signature is legitimate, the car 5C opens the car door. The moving body 11B that transmitted the legitimate signature boards the car 5C. After that, the car 5C closes the car door. The car 5C runs to the destination floor of the moving body 11B. Riding the car 5C, the moving body 11B moves to the destination floor.

FIG. 3 shows an example of operations of a moving body 11.

In step S11, the moving body 11 judges whether or not usage requests started being accepted, on the basis of whether or not the communication unit 7b is receiving notifications or the like. When the judgment result is No, the operations of the moving body 11 return to step S11. When the judgment result is Yes, the operations of the moving body 11 proceed to step S12.

In step S12, the request generation unit 12b of the moving body 11 generates a usage request for the moving body 11. The communication unit 7b of the moving body 11 transmits the generated usage request to the management server 4. After that, the operations of the moving body 11 proceed to step S13.

In step S13, the moving body 11 judges whether or not the communication unit 7b received a notification about an assignment result. When the judgment result is No, the operations of the moving body 11 proceed to step S12. Alternatively, when the judgment result is No, if no update is to be made to the desired price for the usage fee or the like, the operations of the moving body 11 may return to step S13. On the contrary, when the judgment result is Yes, the operations of the moving body 11 proceed to step S14.

In step S14, on the basis of the notification about the assignment result received by the communication unit 7b, the moving body 11 judges whether or not the call in the corresponding usage request has been assigned. When the judgment result is Yes, the operations of the moving body 11 proceed to step S15. When the judgment result is No, the operations of the moving body 11 regarding the usage of the elevator 2 are completed.

In step S15, the moving body 11 moves from the departure floor to the destination floor, by using the car 5 to which the call was assigned. Prior to boarding the car 5, the moving body 11 may transmit the electronic signature to the management server 4, for example. After the moving body 11 arrives at the destination floor, the operations of the moving body 11 regarding the usage of the elevator 2 are completed.

The moving body server 13 that controls the moving of the moving body 11 may take operations similar to the operations of the moving body 11 indicated in steps S11 through S15.

FIG. 4 shows an example of operations of the management server 4.

In step S21, the assignment unit 8 judges whether or not it is time to start accepting usage requests. The time to start accepting the usage requests may be, for example, a certain time set in each cycle in advance. When the judgment result is No, the operations of the management server 4 return to step S21. When the judgment result is Yes, the operations of the management server 4 proceed to step S22.

In step S22, the communication unit 7a of the management server 4 notifies, for example, each of the plurality of moving bodies 11 and the moving body server 13 that usage requests start being accepted. After that, the operations of the management server 4 proceed to step S23.

In step S23, the communication unit 7a of the management server 4 receives one or more usage requests. After that, the operations of the management server 4 proceed to step S24. In this situation, the communication unit 7a of the management server 4 may wait until at least one usage request is received. Alternatively, when the communication unit 7a of the management server 4 has received no usage request before a time period set in advance elapses, the operations of the management server 4 related to the usage of the elevator 2 by the moving bodies 11 may be completed.

In step S24, the assignment unit 8 performs the assignment process on the one or more usage requests received by the communication unit 7a. After that, the operations of the management server 4 proceed to step S25.

In step S25, the communication unit 7a of the management server 4 notifies the moving body 11 from which the usage request was received, the moving body server 13, and the elevator unit 3 to which the call was assigned of an assignment result. After that, the operations of the management server 4 proceed to step S26.

In step S26, the assignment unit 8 judges whether or not the communication unit 7a received a legitimate electronic signature. For example, when the communication unit 7a received no electronic signature, the assignment unit 8 presents a judgement result of No. Also, when the electronic signature received by the communication unit 7a is illegitimate, i.e., when the moving body 11 that transmitted the electronic signature is not the same as the moving body 11 of which the call was assigned, the assignment unit 8 presents a judgment result of No. When the judgment result is No, the operations of the management server 4 return to step S26. On the contrary, when the electronic signature received by the communication unit 7a is legitimate, i.e., when the moving body 11 that transmitted the electronic signature is the same as the moving body 11 of which the call was assigned, the assignment unit 8 presents a judgment result of Yes. When the judgment result is Yes, the operations of the management server 4 proceed to step S27.

In step S27, the communication unit 7a of the management server 4 notifies the moving body 11 that transmitted the electronic signature and the control panel 6 of the elevator unit 3 including the car 5 to which the call was assigned, of a verification result of the electronic signature. After that, the operations of the management server 4 regarding the usage of the elevator 2 by the moving bodies 11 are completed.

FIG. 5 shows an example of operations of the elevator unit 3.

In step S31, the control panel 6 judges whether or not a notification about an assignment result is received. When the judgment result is No, the operations of the elevator unit 3 return to step S31. When the judgment result is Yes, the operations of the elevator unit 3 proceed to step S32.

In step S32, on the basis of the received notification, the control panel 6 judges whether or not a call from a moving body 11 has been assigned to the car 5 controlled thereby. When the judgment result is Yes, the operations of the elevator unit 3 proceed to step S33. When the judgment result is No, the operations of the elevator unit 3 related to the usage by the moving body 11 are completed.

In step S33, the control panel 6 judges whether or not a notification about a verification result indicating a legitimate electronic signature is received from the management server 4. When the judgment result is No, the operations of the elevator unit 3 return to step S33. When the judgment result is Yes, the operations of the elevator unit 3 proceed to step S34.

In step S34, the control panel 6 causes the car 5 controlled thereby to take operations in response to the assigned call. The operations taken in response to the call may include, for example, opening the car door on the departure floor and running the car 5 from the departure floor to the destination floor. After that, the operations of the elevator unit 3 related to the usage by the moving body 11 are completed.

As explained above, the charging system 1 according to Embodiment 1 includes the one or more cars 5 and the management server 4. Each of the cars 5 is capable of transporting any one of the plurality of moving bodies 11 by running between the plurality of floors. The management server 4 includes the communication unit 7a, the assignment unit 8, and the storage unit 9a. The communication unit 7a receives the one or more usage requests. Each of the usage requests corresponds to a different one of the plurality of moving bodies 11. Each of the usage requests includes the information about a call. The information about a call included in each of the usage requests is the information of the call requesting to be assigned to one of the one or more cars 5. Each of the usage requests includes the information about the desired price for the usage fee of the car 5. The assignment unit 8 assigns each call to one of the one or more cars 5 while prioritizing calls in usage requests having higher priority among the one or more usage requests received by the communication unit 7a, based on information including the desired prices. The storage unit 9a stores therein the usage fee to be charged for each of the usage requests of which the calls were assigned by the assignment unit 8.

Further, each of the moving bodies 11 according to Embodiment 1 includes the request generation unit 12b and the communication unit 7b. The request generation unit 12b generates the usage request corresponding to the moving body 11. The communication unit 7b transmits the usage request generated by the request generation unit 12b to the management server 4.

Further, the moving body server 13 according to Embodiment 1 includes the moving body control unit 14, the request generation unit 12c, and the communication unit 7c. The moving body control unit 14 remotely control the moving of the moving bodies 11. The request generation unit 12c generates a usage request corresponding to any of the moving bodies 11. The communication unit 7c transmits the usage request generated by the request generation unit 12c to the management server 4.

Further, a charging method for the elevator 2 according to Embodiment 1 includes a reception step, an assignment step, and a charging step. The reception step is a step of receiving the one or more usage requests each of which corresponds to a different one of the plurality of moving bodies 11. The assignment step is a step of assigning each call to one of the one or more cars 5 while prioritizing calls in usage requests having higher priority among the one or more usage requests received in the reception step, based on information including the desired prices. The charging step is a step of storing the usage fee to be charged for each of the usage requests of which the calls were assigned in the assignment step.

Further, the charging program according to Embodiment 1 causes the management server 4 to perform a reception step, an assignment step, and a charging step. The reception step is a step of receiving the one or more usage requests each of which corresponds to a different one of the plurality of moving bodies 11. The assignment step is a step of assigning each call to one of the one or more cars 5 while prioritizing calls in usage requests having higher priority among the one or more usage requests received in the reception step, based on information including the desired prices. The charging step is a step of storing the usage fee to be charged for each of the usage requests of which the calls were assigned in the assignment step.

Further, the usage program according to Embodiment 1 causes any of the moving bodies 11 to perform a request generation step and a transmission step. The request generation step is a step of generating a usage request corresponding to the moving body 11. The transmission step is a step of transmitting the usage request generated in the request generation step to the management server 4.

Further, the usage program according to Embodiment 1 causes the moving body server 13 to perform a request generation step and a transmission step. The request generation step is a step of generating a usage request corresponding to any of the moving bodies 11 of which the moving is remotely controlled by the moving body server 13. The transmission step is a step of transmitting the usage request generated in the request generation step to the management server 4.

Further, a data structure of the usage request according to Embodiment 1 includes the information about a call. The information about a call included in the usage request is the information of the call requesting to be assigned to one of the one or more cars 5. A data structure of the usage request includes the information about the desired price for the usage fee of the car 5. The data structure of the usage request is used for the assignment process of assigning each call to one of the one or more cars 5 while prioritizing calls in usage requests having higher priority based on information including the desired prices.

Further, a data structure of a usage history according to Embodiment 1 includes the information about the usage fee to be charged for each of the usage requests of which the calls were assigned in the assignment process. The data structure of the usage history is used for the collection process to collect the usage fees.

These configurations make it possible to prioritize the usage of the elevator 2 by one of the moving bodies 11 that presented the highest desired price for the usage fee. Accordingly, on the basis of a market principle, an appropriate usage fee reflecting the demand of the moving bodies 11 for the usage will be charged. Further, because the appropriate usage fee will be charged, it is possible to prevent the moving bodies 11 from using the elevator 2 disorderly. Consequently, the transport capacity of the elevator 2 is properly adjusted.

Further, each of the one or more usage requests received by the communication unit 7a includes the information about the attributes of the corresponding one of the moving bodies 11. The assignment unit 8 assigns each call to one of the one or more cars 5, while prioritizing calls in usage requests having higher priority among the one or more usage requests received by the communication unit 7a, based on information including the desired prices and the attributes.

As a result, the moving bodies 11 become able to use the elevator 2 on the basis of degrees of urgency based on the attributes, or the like.

Further, when one of the moving bodies 11 boards the car 5 to which the call in the one of the usage requests has been assigned by the assignment unit 8, the communication unit 7a receives, from the moving body 11, the electronic signature indicating the identity of the moving body 11 with the moving body 11 corresponding to the usage request. The car 5 waits without running in response to the call, until the identity of the moving body 11 is confirmed by using the electronic signature.

As a result, even when any of the moving bodies 11 boards illegitimately or boards erroneously, the car 5 is not to start running. Accordingly, the legitimate moving body 11 is able to use the elevator 2 with higher certainty.

Further, the car 5 to which a call in any one of the usage requests has been assigned by the assignment unit 8 maintains the door closed after arriving at the departure floor of the call. The car 5 waits without opening the door until the identity of the moving body 11 is confirmed by using the electronic signature.

As a result, it is possible to prevent the moving bodies 11 from boarding illegitimately and boarding erroneously. Also, it is possible to prevent passengers from boarding erroneously. Consequently, the legitimate moving bodies 11 become able to use the elevator 2 with higher certainty. In addition, it is possible to prevent passengers from erroneously sharing a ride of the car 5 with a moving body 11.

Further, the assignment unit 8 limits the transport capacity to be applied to transporting any one of the plurality of moving bodies 11, to a part of the total transport capacity of the one or more cars 5.

This configuration ensures the transport capacity to be applied to the usage by passengers.

Further, while accepting the usage requests, the management server 4 does not necessarily need to disclose the desired prices. As a usage fee of the elevator 2, for example, the desired price presented by a moving body 11 of which the call has been assigned may be charged. Alternatively, as a usage fee of the elevator 2, for example, a desired price that is the second highest after the desired price presented by a moving body 11 of which the call has been assigned may be charged. In other words, the usage fee of the elevator 2 may be set by using a first price auction scheme or a second price auction scheme, for example.

Further, the elevator 2 may include only one elevator unit 3.

Furthermore, a part or all of the management server 4 may be installed in mutually the same piece of hardware or may be installed in a plurality of pieces of hardware in a distributed manner.

In addition, the moving body server 13 may remotely control the moving of the plurality of moving bodies 11. The moving bodies 11 remotely controlled by the moving body server 13 do not each necessarily need to include a part or all of the request generation unit 12b and the storage unit 9b. The communication unit 7b of each of the moving bodies 11 may communicate only the control signals used in the remote control.

Further, in the charging system 1, all the moving bodies 11 may move without being remotely controlled by the moving body server 13. In that situation, the charging system 1 does not necessarily need to include the moving body server 13. Conversely, in the charging system 1, all the moving bodies 11 may move by being remotely controlled by the moving body server 13.

Next, an example of a hardware configuration of the charging system 1 will be explained with reference to FIG. 6.

Figure 6:
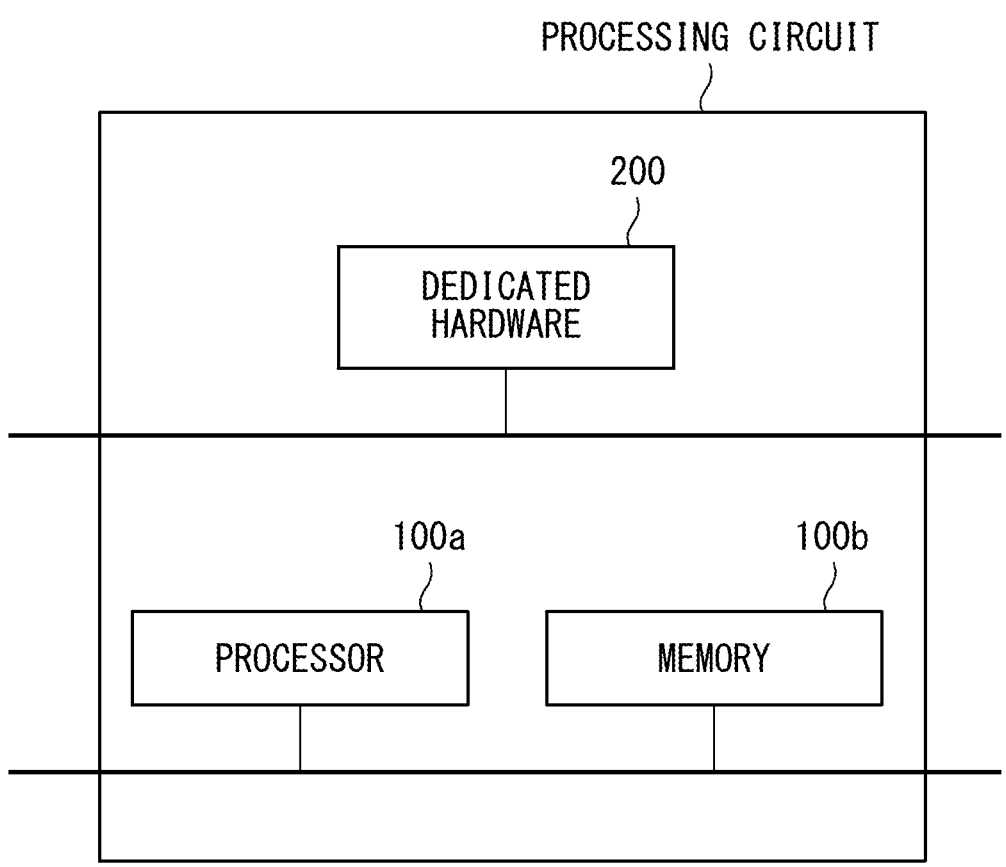
FIG. 6 A hardware configuration diagram of a relevant part of the charging system according to Embodiment 1.
Figure 7:
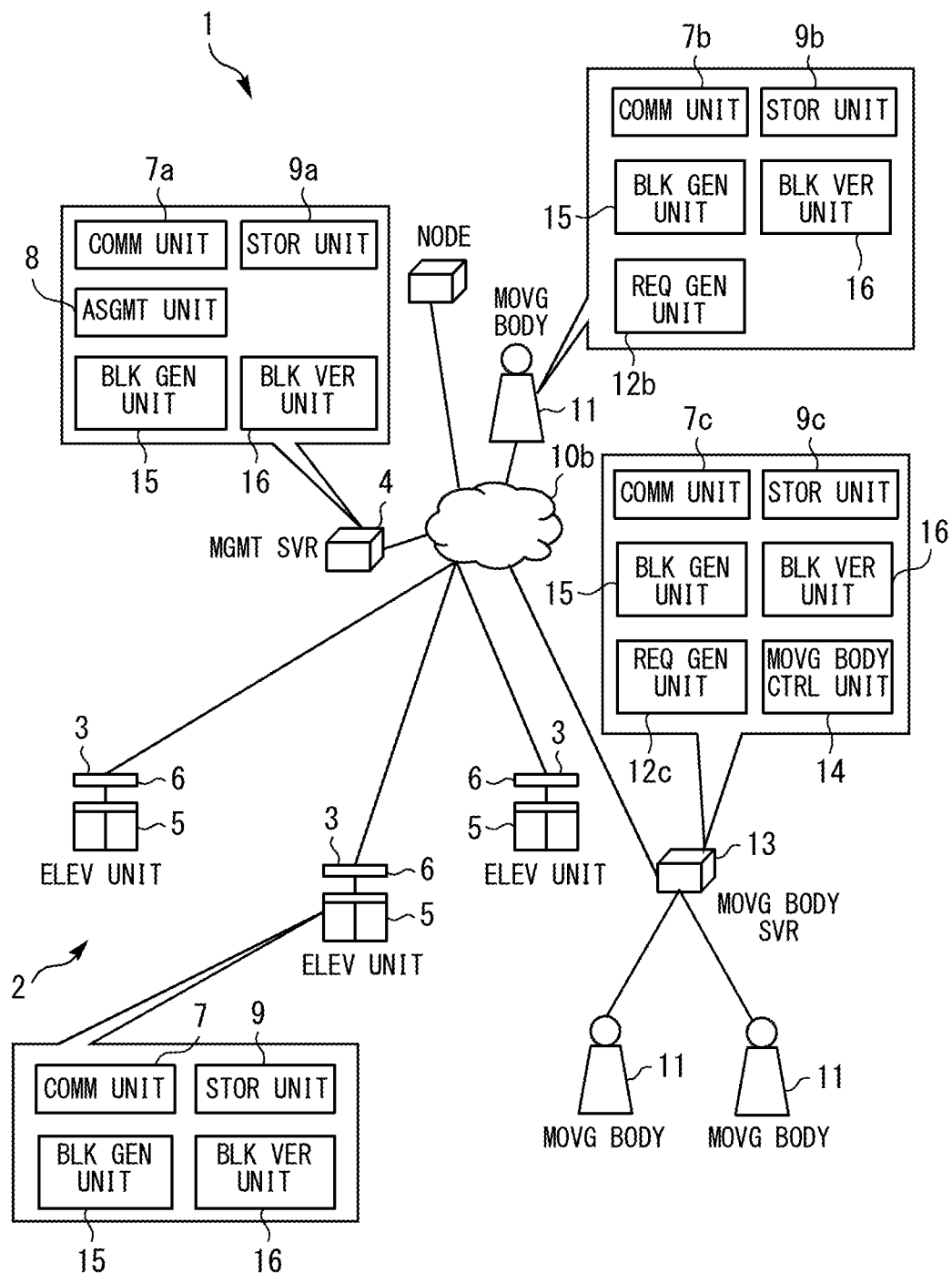
FIG. 7 A configuration diagram of a charging system according to Embodiment 2.

FIG. 6 is a hardware configuration diagram of a relevant part of the charging system 1 according to Embodiment 1.

It is possible to realize functions of the charging system 1 by using a processing circuit. The processing circuit includes at least one processor 100a and at least one memory 100b. The processing circuit may include at least one piece of dedicated hardware 200, in addition to or in place of the processor 100a and the memory 100b.

When the processing circuit includes the processor 100a and the memory 100b, the functions of the charging system 1 are realized by using software, firmware, or a combination of software and firmware. One or both of the software and the firmware may be written as a program. The program is stored in the memory 100b. The processor 100a realizes the functions of the charging system 1 by reading and executing the program stored in the memory 100b.

The processor 100a may be referred to as a Central Processing Unit (CPU), a processing apparatus, an arithmetic operation apparatus, a microprocessor, a microcomputer, or a DSP. For example, the memory 100b may be configured by using a non-volatile or volatile semiconductor memory such as a RAM, a ROM, a flash memory, an EPROM, an EEPROM, or the like.

When the processing circuit includes the dedicated hardware 200, for example, the processing circuit is realized by using a single circuit, a composite circuit, a programmed processor, a parallel-programmed processor, an ASIC, an FPGA, or a combination of any of these.

It is possible to realize each of the functions of the charging system 1 by using a processing circuit. Alternatively, it is also possible to collectively realize the functions of the charging system 1 by using a processing circuit. It is acceptable to realize one part of the functions of the charging system 1 by using the dedicated hardware 200, while realizing the other part thereof by using software or firmware. As described herein, the processing circuit realizes the functions of the charging system 1 by using the dedicated hardware 200, the software, the firmware, or a combination of any of these.

Embodiment 2

In Embodiment 2, differences from the example disclosed in Embodiment 1 will particularly be explained in detail. For certain characteristics that are not explained in Embodiment 2, it is acceptable to adopt any of the characteristics in the examples disclosed in Embodiment 1.

The charging system 1 includes a plurality of nodes. The nodes are connected to one another via a network 10b either directly or indirectly. The network 10b may be a Peer to Peer (P2P) network, for example. Each of the nodes is a device that performs data processing. Each of the nodes represents, for example, a different one of the management server 4, the elevator units 3, the moving bodies 11, the moving body server 13, and the like. Each of the nodes may be a generic device or apparatus such as a personal computer, a server computer, a mobile computer, or the like. The functions of each of the nodes are realized by using a processing circuit, for example.

Information in the charging system 1 such as the usage fee of the elevator 2 is recorded in blocks of a blockchain shared among the plurality of nodes. The blockchain is a data structure including the plurality of blocks that are chained so as to be linked together. In the blockchain, the plurality of blocks are linked together in sequential order. The information about the usage of the elevator 2 by the moving bodies 11 is stored while being distributed among a plurality of blocks of the blockchain. Adding a block to the blockchain is permitted when the plurality of nodes have reached consensus, for example. The consensus in the charging system 1 is reached on the basis of a consensus algorithm such as Proof of Work (PoW) or Proof of Stakes (PoS), for example. In this situation, the blockchain may be a blockchain in a broader sense such as a data structure in which, for example, adding a block is permitted when specific majority of the nodes has reached consensus.

Each of the nodes in the charging system 1 includes a communication unit 7, a storage unit 9, a block generation unit 15, and a block verification unit 16. The communication unit 7 is a part that communicates with an external device or apparatus via the network 10b. In this situation, the external device or apparatus may be another node in the charging system 1. The communication unit 7 may be the communication unit 7a of the management server 4, the communication unit 7b of any of the moving bodies 11, or the communication unit 7c of the moving body server 13. The storage unit 9 is a part that stores information therein. In the charging system 1, the blockchain shared among the plurality of nodes is stored in the storage unit 9. The storage unit 9 may be the storage unit 9a of the management server 4, the storage unit 9b of any of the moving bodies 11, or the storage unit 9c of the moving body server 13. The block generation unit 15 is a part that generates any of the blocks to be added to the blockchain. The block verification unit 16 is a part that verifies validity of any of the blocks to be added to the blockchain. The block generation unit 15 may not be included in one or more of the nodes in the charging system 1.

The charging system 1 is structured by distributing a program to each of the nodes and having the program installed therein in the following manner, for example. In the charging system 1, the usage program regarding the usage of the elevator 2 by the moving bodies 11 is distributed to the moving bodies 11 each of which is one of the nodes, so as to be installed therein. Also, in the charging system 1, the usage program regarding the usage of the elevator 2 by the moving bodies 11 is distributed to the moving body server 13, which is one of the nodes, so as to be installed therein. Further, in the charging system 1, the charging program regarding the usage of the elevator 2 by the moving bodies 11 may be distributed to the management server 4, which is one of the nodes, so as to be installed therein. Further, in the charging system 1, a program handling the shared blockchain is distributed to the devices that are the nodes, so as to be installed therein. The programs distributed in the charging system 1 are distributed, for example, from a distribution server via a communication network such as the Internet. In another example, the programs distributed in the charging system 1 may be distributed offline by using a storage media or the like, for example.

Next, an example of the shared blockchain will be explained with reference to FIG. 8.

Figure 8:
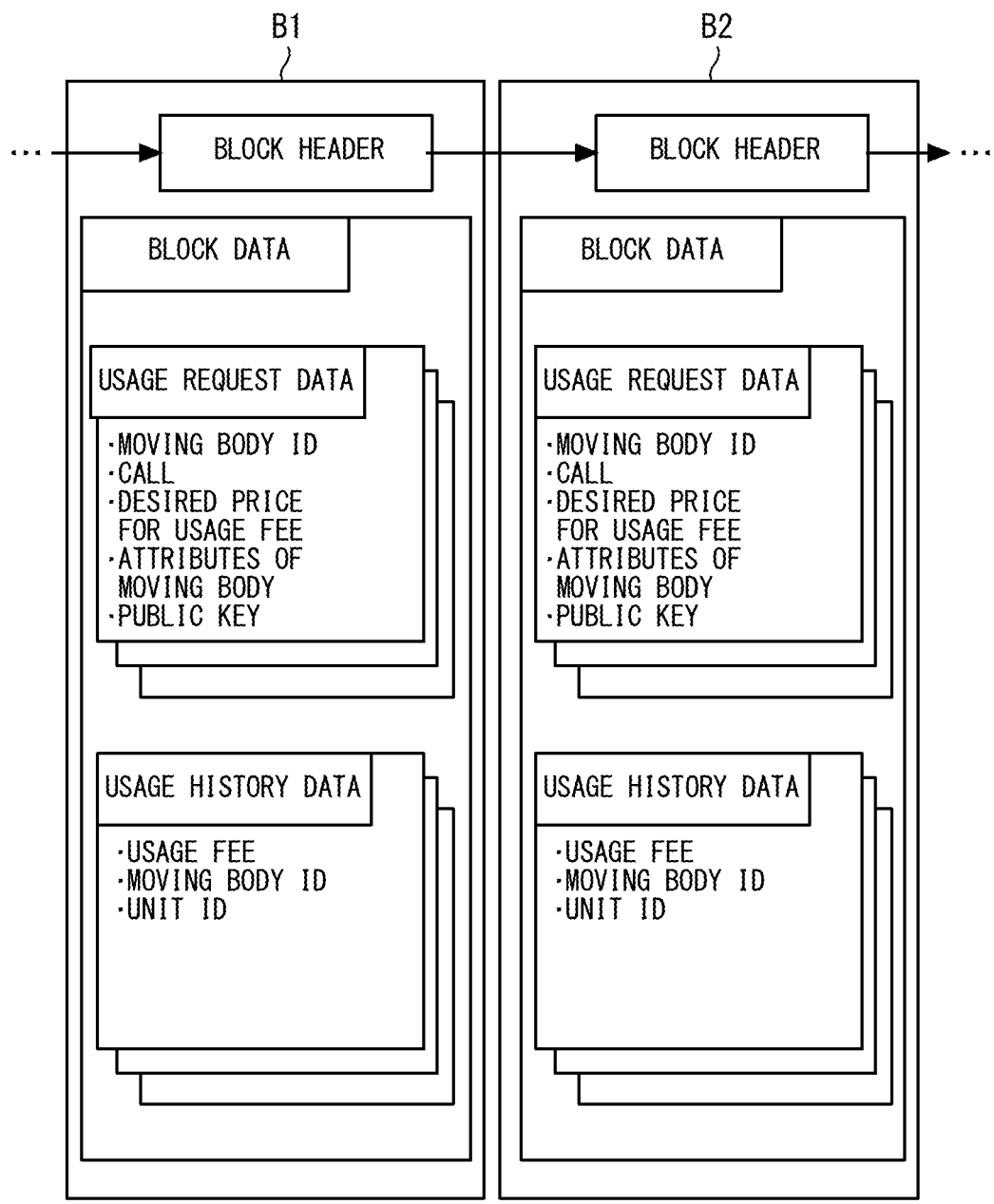
FIG. 8 A drawing showing an example of a data structure of the blockchain according to Embodiment 2.

FIG. 8 is a drawing showing an example of a data structure of the blockchain according to Embodiment 2.

In the present example, the blockchain has a plurality of blocks including a block B1 and a block B2. The block B1 is a block immediately preceding the block B2. Each of the blocks includes block data and a block header.

The block data is information recorded in the blockchain. The block data includes a usage request and a usage history.

The usage request is data expressing a request for usage of the elevator 2 by any of the moving bodies 11 that was received by the management server 4. The block data records therein usage requests of which the calls were actually assigned by the assignment unit 8 of the management server 4. Each of the usage requests includes, for example, information such as a moving body ID for identifying a corresponding one of the moving bodies 11, information about a call, information about a desired price for the usage fee, information about the attributes of a corresponding one of the moving bodies 11, and a public key for the electronic signature of a corresponding one of the moving bodies 11.

The usage history is data expressing a history of usage of the elevator 2 by any of the moving bodies 11. The usage history includes, for example, information such as a usage fee charged for the usage of the elevator 2, the moving body ID of the moving body 11 that used the elevator 2, and a unit ID identifying the elevator unit 3 used by the moving body 11.

The block header includes information indicating the content of the immediately-preceding block. For example, the block header of the block B2 includes a hash value of the immediately-preceding block B1 or the like. Alternatively, in the situation where the block header of the block B1 includes a hash value of the block data of the same block, i.e., the block B1, the block header of the block B2 may include a hash value of the block header of the immediately-preceding block B1. As explained herein, in the blockchain, because the block header includes the information indicating the content of the immediately-preceding block such as the hash value, for example, the plurality of blocks are chained together. The block header may include information such as a time stamp of the time at which the block was generated.

Next, examples of operations of the charging system 1 will be explained with reference to FIG. 9 and FIG. 10.

Figure 9:
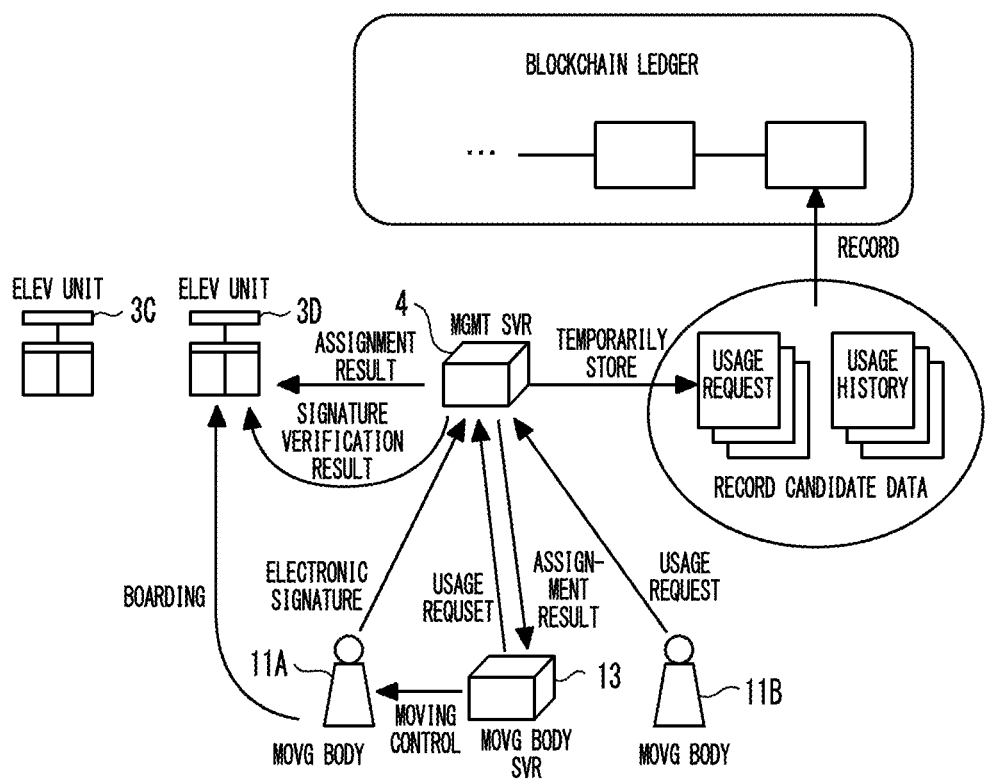
FIG. 9 A drawing for explaining an example of a charging process by the charging system according to Embodiment 2.

FIG. 9 is a drawing for explaining an example of a charging process by the charging system 1 according to Embodiment 2.

Figure 10:
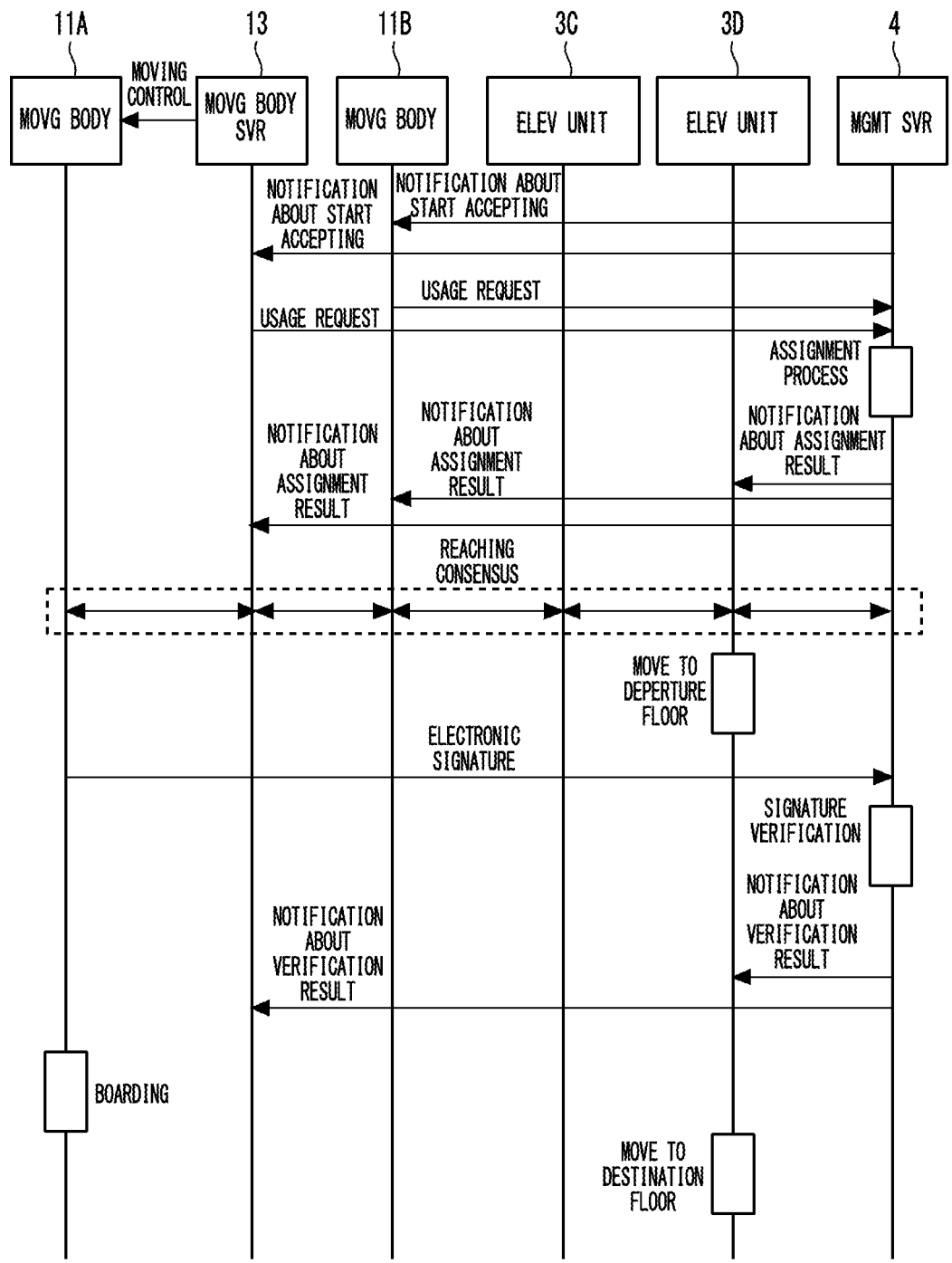
FIG. 10 A sequence diagram showing examples of operations of the charging system according to Embodiment 2.

FIG. 10 is a sequence diagram showing examples of operations of the charging system 1 according to Embodiment 2.

As shown in FIG. 9, in the present example, usage of the elevator 2 by the moving body 11A and the moving body 11B is requested. The moving of the moving body 11A is controlled by the moving body server 13. The management server 4 calculates the elevator unit 3C having the car 5C and the elevator unit 3D having the car 5D into a transport resource.

The management server 4 notifies each of the moving bodies 11 and the moving body server 13 in the charging system 1 that usage requests start being accepted, by broadcasting a notification, for example.

The request generation unit 12c of the moving body server 13 generates a usage request corresponding to the moving body 11A. The communication unit 7c of the moving body server 13 transmits the usage request generated by the request generation unit 12c to the management server 4. The request generation unit 12b of the moving body 11B generates a usage request corresponding to the moving body 11B. When usage requests started being accepted, the communication unit 7b of the moving body 11B transmits the usage request generated by the request generation unit 12b to the management server 4.

The communication unit 7a of the management server 4 receives the usage request corresponding to the moving body 11A and the usage request corresponding to the moving body 11B. The storage unit 9a of the management server 4 temporarily stores therein the received usage requests. The usage requests received by the communication unit 7a of the management server 4 may temporarily be stored in the storage unit 9 of another node other than the management server 4. By performing the assignment process, the assignment unit 8 of the management server 4 assigns the call in the usage request having the highest priority to one of the cars 5 being assignment candidates. In the present example, the assignment unit 8 assigns the call from the moving body 11A to the car 5D.

The assignment unit 8 of the management server 4 temporarily stores the usage request of which the call has been assigned, into the storage unit 9a, as record candidate data. The record candidate data may be stored in the storage unit 9 of another node other than the management server 4. In the present example, the assignment unit 8 stores the usage request corresponding to the moving body 11A into the storage unit 9a as the record candidate data.

The communication unit 7a of the management server 4 notifies the control panel 6 of the elevator unit 3D of the assignment result. The communication unit 7a of the management server 4 notifies the moving body server 13 for the moving body 11A from which the usage request was received and the moving body 11B of the assignment result.

After that, the control panel 6 of the elevator unit 3D notified of the assignment result causes the car 5D to run to the departure floor of the moving body 11A.

The moving body server 13 causes the moving body 11A of which the call in the corresponding usage request has been assigned, to move to the hall on the departure floor so as to be able to board the car 5D. Alternatively, if the moving body 11A is already present in the hall, the moving body server 13 causes the moving body 11A to wait in the hall until the car 5D arrives. Meanwhile, at the next time when usage requests start being accepted, the request generation unit 12b of the moving body 11B again generates a usage request corresponding to the moving body 11B.

After that, the car 5D arrives at the departure floor of the moving body 11A. When boarding the car 5D, the moving body 11A transmits the electronic signature to the management server 4 via the communication unit 7b, for example. In this situation, a secret key for encrypting the electronic signature corresponds to the public key included in the usage request corresponding to the moving body 11A, for example.

The communication unit 7a of the management server 4 receives the electronic signature transmitted thereto from the moving body 11A. The assignment unit 8 verifies the identity of the moving body 11 by checking to see whether or not it is possible to decrypt the electronic signature by using the public key included in the usage request of which the call has been assigned, for example.

The communication unit 7a of the management server 4 notifies the control panel 6 of the elevator unit 3D of a verification result of the electronic signature. The communication unit 7a of the management server 4 notifies the moving body 11A that transmitted the electronic signature of the verification result of the electronic signature. Further, if the electronic signature is illegitimate, the communication unit 7a of the management server 4 does not need to provide the notification about the verification result of the electronic signature.

When the electronic signature is illegitimate, the car 5D maintains the car door closed. The car 5D waits to open the car door until being notified by the management server 4 of a verification result indicating a legitimate electronic signature. In this situation, the car 5D waits on the departure floor. Because the car 5D maintains the car door closed, any moving body 11 that transmitted an illegitimate electronic signature is not to board the car 5D.

On the contrary, when the electronic signature is legitimate, the car 5D opens the car door. The moving body 11A that transmitted the legitimate electronic signature boards the car 5D. After that, the car 5D closes the car door. The car 5D runs to the destination floor of the moving body 11A. Riding the car 5D, the moving body 11A moves to the destination floor.

When the moving body 11A has used the car 5D, a usage history of the moving body 11A is temporarily stored into the storage unit 9 of each of the nodes, as record candidate data. The usage history may be generated by the assignment unit 8 when the electronic signature from the moving body 11A is verified, for example. Alternatively, the usage history may be generated by the elevator unit 3D when the moving body 11A boards the car 5D, for example.

Any of the nodes including the block generation unit 15 attempts to generate a block including the record candidate data. For example, the block generation unit 15 attempts to generate the block by searching for a nonce value that satisfies a validity condition of the block. The validity condition of the block may be, for example, that the hash value is smaller than a value determined on the basis of a consensus algorithm or the like. The block generation unit 15 in one or more of the nodes successfully generates the block. The communication unit 7 of any of the nodes that successfully generated the block transmits the generated block to the plurality of nodes connected to the network 10b.

The block verification unit 16 of each of the nodes verifies validity of the received block on the basis of whether or not a validity condition is satisfied. When a block is judged by the block verification unit 16 to be not valid, the block will not be added to the blockchain. On the contrary, when a block is judged by the block verification unit 16 to be valid, the block will be added to the blockchain stored in the storage unit 9.

The usage request corresponding to one of the moving bodies 11 and the usage history of the one of the moving bodies 11 may be recorded in mutually the same block. The usage request corresponding to one of the moving bodies 11 and the usage history of the one of the moving bodies 11 may be recorded in mutually different blocks.

In the charging system 1, a usage fee will be collected on the basis of the information recorded in the blocks of the blockchain shared among the nodes. In the charging system 1, when no usage history is recorded regarding a usage request of which the call has been assigned, it is acceptable to exempt the usage fee from the collection on the assumption that the elevator 2 was actually not used.

FIG. 10 shows examples of operations in the entirety of the charging system 1.

In the present example, usage of the elevator 2 by the moving body 11A and the moving body 11B is requested. The moving of the moving body 11A is controlled by the moving body server 13.

The consensus regarding generating a block in the blockchain is reached, for example, after the assignment unit 8 of the management server 4 performs the assignment process. In this situation, for example, a usage request of which the call has been assigned in the assignment process is added to a recorded block. A usage history regarding the usage request is recorded into another block to be added subsequently, for example. In this situation, the time at which a block in the blockchain is generated may be independent of the time at which the elevator 2 is used. Any of the blocks in the blockchain may record therein a plurality of usage requests and a plurality of usage histories.

As explained above, in the charging system 1 according to Embodiment 2, the storage unit 9a stores therein the blockchain shared among the plurality of nodes connected to one another via the network 10b. The storage unit 9a stores the usage fees of the elevator 2, by recording the usage fees in the blocks of the blockchain.

Further, the usage histories of the elevator 2 according to Embodiment 2 are recorded in the blocks of the blockchain shared among the plurality of nodes connected to one another via the network 10b.

Recording the usage histories in the blockchain makes it difficult to tamper the usage histories. Consequently, integrity of the usage histories is guaranteed.

Further, the storage unit 9a stores the usage request of which the call was assigned by the assignment unit 8, by recording the usage request in a block of the blockchain.

Further, the usage requests of the elevator 2 are recorded in the blocks of the blockchain.

As a result, any of the moving bodies 11 or the like that uses the elevator 2 is able to obtain the information about the usage requests of which the integrity is guaranteed. Consequently, the market price of the usage fees is kept transparent.

Furthermore, the storage unit 9a shares the blockchain with at least one of the plurality of moving bodies 11. In addition, the storage unit 9a shares the blockchain with the moving body server 13 which remotely controls the moving of at least one of the plurality of moving bodies 11.

The nodes sharing the blockchain may include the plurality of moving bodies 11 and/or the moving body server 13. As a result, it is possible to increase the types and the quantity of the nodes. Also, the subjects that manage the nodes are diverse. This configuration thus makes it more difficult to tamper the information recorded in the blocks of the blockchain.

INDUSTRIAL APPLICABILITY

The charging system according to the present disclosure is applicable to charging of a usage fee for usage of an elevator by a moving body. Further, the management server, the moving bodies, the moving body server, the charging method, the charging program, the usage program, and the data structures of the usage requests and the usage histories of the present disclosure are applicable to the charging system.

REFERENCE SIGNS LIST

1 Charging system
2 Elevator
3, 3C, 3D Elevator unit
4 Management server
5, 5C, 5D Car
6 Control panel
7, 7a, 7b, 7c Communication unit
8 Assignment unit
9, 9a, 9b, 9c Storage unit
10a, 10b Network
11, 11A, 11B Moving body
12b, 12c Request generation unit
13 Moving body server
14 Moving body control unit
15 Block generation unit
16 Block verification unit
100a Processor
100b Memory
200 Dedicated hardware

The invention claimed is:

1. An elevator charging system comprising:
one or more cars each capable of transporting any one of a plurality of moving bodies, by running between a plurality of floors; and
processing circuitry
to receive one or more usage requests each of which includes information about a call requesting to be assigned to one of the one or more cars and information about a desired price for a usage fee of the car and each of which corresponds to a different one of the plurality of moving bodies;
to assign each of the calls to one of the one or more cars, while prioritizing calls in usage requests having higher priority among the one or more usage requests received by the processing circuitry, based on information including the desired prices; and
to store therein the usage fee to be charged for each of the usage requests of which the calls were assigned by the processing circuitry.

2. The elevator charging system according to claim 1, wherein
the processing circuitry stores therein a blockchain shared among a plurality of nodes connected to one another via a network, and
the processing circuitry stores the usage fees therein by recording the usage fees in a block of the blockchain.

3. The elevator charging system according to claim 2, wherein the processing circuitry stores therein the usage requests of which the calls were assigned by the processing circuitry by recording the usage requests in the block of the blockchain.

4. The elevator charging system according to claim 2, wherein the processing circuitry shares the blockchain with at least one of the plurality of moving bodies.

5. The elevator charging system according to claim 2, wherein the processing circuitry shares the blockchain with a moving body server that remotely controls moving of at least one of the plurality of moving bodies.

6. The elevator charging system according to claim 1, wherein
each of the one or more usage requests received by the processing circuitry includes information about an attribute of a corresponding one of the moving bodies, and
the processing circuitry assigns each of the calls to one of the one or more cars, while prioritizing the calls in the usage requests having higher priority among the one or more usage requests received by the processing circuitry, based on information including the desired prices and the attributes.

7. The elevator charging system according to claim 1, wherein
when one of the plurality of moving bodies boards a car to which the call in one of the usage requests has been assigned by the processing circuitry, the processing circuitry receives, from the moving body, an electronic signature indicating identity of the moving body with the moving body corresponding to the usage request, and
the car waits without running in response to the call until the identity of the moving body is confirmed by using the electronic signature.

8. The elevator charging system according to claim 7, wherein the car to which the call in one of the usage requests has been assigned by the processing circuitry maintains a door closed after arriving at a departure floor of the call and waits without opening the door until the identity of the moving body is confirmed by using the electronic signature.

9. The elevator charging system according to claim 1, wherein the processing circuitry limits a transport capacity to be applied to transporting any one of the plurality of moving bodies to a part of a total transport capacity of the one or more cars.

10. An elevator management server comprising:
processing circuitry
to receive one or more usage requests each of which includes information about a call requesting to be assigned to one of one or more cars each capable of transporting any one of a plurality of moving bodies by running between a plurality of floors and information about a desired price for a usage fee of the car and each of which corresponds to a different one of the plurality of moving bodies;
to assign each of the calls to one of the one or more cars, while prioritizing calls in usage requests having higher priority among the one or more usage requests received by the processing circuitry, based on information including the desired prices; and
to store therein the usage fee to be charged for each of the usage requests of which the calls were assigned by the processing circuitry.

11. A moving body comprising:
processing circuitry
to generate a usage request including information about a call requesting to be assigned to one of one or more cars each running between a plurality of floors and information about a desired price for a usage fee of the car;
to transmit the usage request generated by the processing circuitry to a management server that assigns each call to one of the one or more cars, while prioritizing calls in usage requests having higher priority among one or more usage requests received, based on information including desired prices; and
to transmit, when receiving a notification from the management server about an assignment result indicating that the call in the usage request generated by the processing circuitry has been assigned to one of the one or more cars, an electronic signature to the management server indicating identity with the transmission source of the usage request before boarding the car to which the call was assigned.

12. A moving body comprising:
processing circuitry
to generate a usage request including information about a call requesting to be assigned to one of one or more cars each running between a plurality of floors and information about a desired price for a usage fee of the car;
to transmit the usage request to a management server that assigns each call to one of the one or more cars, while prioritizing calls in usage requests having higher priority among one or more usage requests received, based on information including desired prices; and
to wait, when receiving a notification from the management server about an assignment result indicating that the call in the usage request generated by the processing circuitry has been assigned to one of the one or more cars, without boarding the car to which the call in the usage request was assigned until the management server opens a door of the car.

13. A moving body server comprising:
processing circuitry
to remotely control moving of a moving body;
to generate a usage request which includes information about a call requesting to be assigned to one of one or more cars each running between a plurality of floors and information about a desired price for a usage fee of the car and which corresponds to the moving body; and
to transmit the usage request to a management server that assigns each call to one of the one or more cars, while prioritizing calls in usage requests having higher priority among one or more usage requests received, based on information including desired prices; wherein
when receiving a notification from the management server about an assignment result indicating that the call in the usage request generated by the processing circuitry has been assigned to one of the one or more cars, the processing circuitry remotely controls the moving body to board the car to which the call in the usage request was assigned,
when receiving a notification from the management server about an assignment result indicating that the call in the usage request generated by the processing circuitry has not been assigned to any one of the one or more cars, the processing circuitry generates the usage request which corresponds to the moving body again.

14. An elevator charging method comprising:
receiving one or more usage requests each of which includes information about a call requesting to be assigned to one of one or more cars each capable of transporting any one of a plurality of moving bodies by running between a plurality of floors and information about a desired price for a usage fee of the car and each of which corresponds to a different one of the plurality of moving bodies, each of the one or more usage requests includes information about attributes of the corresponding moving body;
assigning each of the calls to one of the one or more cars, while prioritizing calls in usage requests having higher priority among the one or more usage requests, based on information including the desired prices and the attributes; and
storing the usage fee to be charged for each of the usage requests of which the calls were assigned.

15. A storage medium storing an elevator charging program that causes a management server for an elevator, the elevator having one or more cars each capable of transporting any one of a plurality of moving bodies by running between a plurality of floors, to perform:
receiving one or more usage requests each of which includes information about a call requesting to be assigned to one of the one or more cars and information about a desired price for a usage fee of the car and each of which corresponds to a different one of the plurality of moving bodies;
assigning each of the calls to one of the one or more cars, while prioritizing calls in usage requests having higher priority among the one or more usage requests, based on information including the desired prices; and
storing the usage fee to be charged for each of the usage requests of which the calls were assigned.

16. A storage medium storing an elevator usage program that causes a moving body, the moving body being capable of moving between a plurality of floors, by using one of one or more cars of an elevator each running between the plurality of floors, to preform:

generating a usage request which includes information about a call requesting to be assigned to one of the one or more cars and information about a desired price for a usage fee of the car and which corresponds to the moving body;

transmitting the generated usage request to a management server that assigns each call to one of the one or more cars, while prioritizing calls in usage requests having higher priority among one or more usage requests received, based on information including desired prices; and transmitting, when receiving a notification from the management server about an assignment result indicating that the call in the generated usage request has been assigned to one of the one or more cars, an electronic signature to the management server indicating identity with the transmission source of the generated usage request before boarding the car to which the call was assigned.

17. A storage medium storing an elevator usage program that causes a moving body, the moving body being capable of moving between a plurality of floors, by using one of one or more cars of an elevator each running between the plurality of floors, to preform:

generating a usage request which includes information about a call requesting to be assigned to one of the one or more cars and information about a desired price for a usage fee of the car and which corresponds to the moving body;

transmitting the generated usage request to a management server that assigns each call to one of the one or more cars, while prioritizing calls in usage requests having higher priority among one or more usage requests received, based on information including desired prices; and waiting, when receiving a notification from the management server about an assignment result indicating that the call in the generated usage request has been assigned to one of the one or more cars, without boarding the car to which the call in the generated usage request was assigned until the management server opens a door of the car.

18. A storage medium storing an elevator usage program that causes a moving body server, the moving body server remotely controlling moving of a moving body capable of moving between a plurality of floors by using one of one or more cars of an elevator each running between the plurality of floors, to perform:

generating a usage request which includes information about a call requesting to be assigned to one of the one or more cars and information about a desired price for a usage fee of the car and which corresponds to the moving body;

transmitting the generated usage request to a management server that assigns each call to one of the one or more cars, while prioritizing calls in usage requests having higher priority among one or more usage requests received, based on information including desired prices;

remotely controlling, when receiving a notification from the management server about an assignment result indicating that the call in the generated usage request has been assigned to one of the one or more cars, the moving body to board the car to which the call in the generated usage request was assigned; and generating again, when receiving a notification from the management server about an assignment result indicating that the call in the generated usage request has not been assigned to any one of the one or more cars, the usage request which corresponds to the moving body.

\* \* \* \* \*